Patented July 19, 1949

2,476,557

UNITED STATES PATENT OFFICE 2,476,557

4-[{(2-AMINO - 4 - HYDROXY- 6 -PTERIDYL) METHYL} AMINO] BENZENESULFONYLA-MIDE AND SALTS THEREOF

Gustav J. Martin, Philadelphia, and Souren Avakian, Oreland, Pa., assignors to The National Drug Company, Philadelphia, Pa., a corporation of Pennsylvania No Drawing. Application February 25, 1948, Serial No. 10,943

3 Claims. (Cl. 260—239.6)

Our invention relates to new chemotherapeutic agents, more particularly, to the novel compound, 4 - [{(2 - amino - 4 - hydroxy - 6 - pteridyl) methyl} amino]benzenesulfonylamide and its salts.

The 4 - [{2 - amino - 4 - hydroxy - 6-pteridyl) methyl}amino]benzenesulfonylamide is an effective displacing agent for folic acid, a member of the vitamin B complex. It differs widely in chemical constitution, however, because it contains the benezenesulfonylamide radical in place of the benzoyl glutamic acid radical of the folic acid. It is surprising that such a differently constituted compound will act as an effective displacer for the folic acid.

We have found that the 4-[{(2-amino-4-hydroxy - 6 - pteridyl) methyl}amino]benzenesulfonylamide and its salts are highly effective blood pressure depressants. In dosages from 1 to 5 milligrams given intravenously they produce a drop in blood pressure of from 30 to 100 mm. Hg and sustain this drop in blood pressure for from 10 minutes to 2½ hours. They may also be administered subcutaneously and intramuscularly employing approximately the same dosage levels. If administered orally, much larger doses are required to achieve the same results as when injected. The 4 - [{(2 - amino-4-hydroxy-6-pteridyl methyl}amino]benzenesulfonylamide may be put up in convenient tablet form for oral administration, each tablet containing from 50 to 500 mg., or in ampule form for injection, such ampules containing an aqueous solution of one of its salts; for example, a solution of 25 mg. of the sodium salt per ampule.

The 4 - [{(2 - amino - 4 - hydroxy - 6 - pteridyl) methyl}amino]benezenesulfonylamide may be prepared by the same general methods as have been described by Angier and his coworkers in Science, volume 103 (1946), on page 667 and following, for the synthesis of folic acid. The salts are prepared from the 4-[{(2-amino-4-hydroxy-6 - pteridyl)methyl}amino]benzenesulfonylamide in the usual manner by treatment with acids or bases. Among the simple salts that have been prepared and found to be effective, there may be mentioned the sodium and potassium salts, as well as the hydrochloride and hydrosulfate. Obviously the other salts, such as the ammonium salt, the sulfate, phosphate, hydrosulfite, etc. may be similarly prepared and will be equally effective, provided they can be dissolved and are not toxic.

The following example will serve to illustrate how our novel chemotherapeutic agents may be prepared. Other suitable methods will, no doubt, be apparent to those skilled in the art.

*Example*

An acetate buffer solution is prepared by adding 54.4 cc. of glacial acetic acid to 940 cc. of water and dissolving 66.9 grams of anhydrous sodium acetate therein. In this buffer solution there are suspended 25 grams of 1,2-dibromopropionaldehyde, 25 grams of 2,4,5-triamino-6-hydroxypyrimidine and 16 grams of para-aminobenzenesulfonylamide. The suspension is then stirred for three hours at room temperature. The crude product formed is filtered from the solution, washed with water and then with alcohol. It is then further purified by dissolving in a dilute sodium hydroxide solution. Small amounts of insoluble material are filtered off and the product is precipitated at pH 5. The precipitate is washed with water, hot alcohol and finally with ether.

The pure product thus obtained consists of 4-[{(2-amino - 4 - hydroxy - 6 - pteridyl)methyl} amino]benzensulfonylamide. It is a yellow material decomposing above 275° C. It is soluble in aqueous solutions of alkalies and acids forming the corresponding salts.

It is to be understood, of course, that variations in the above procedures are permissible, and this invention is not restricted to the precise reactions and reaction conditions above set forth.

We claim:

1. Chemotherapeutic agents comprising a compound selected from the group consisting of 4-[{(2-amino-4 - hydroxy - 6 - pteridyl) methyl} amino] benzenesulfonylamide and its salts.

2. 4-[{(2 - amino - 4 - hydroxy - 6 - pteridyl) methyl}amino] benzenesulfonylamide.

3. The alkali metal salts of 4-[{(2-amino-4-hydroxy - 6 - pteridyl) methyl}amino]benezenesulfonylamide.

GUSTAV J. MARTIN.
SOUREN AVAKIAN.

No references cited.